United States Patent
Kawakami et al.

(10) Patent No.: US 10,974,145 B2
(45) Date of Patent: Apr. 13, 2021

(54) INTERVENTION SERVER AND INTERVENTION PROGRAM

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/652,375

(22) PCT Filed: Nov. 28, 2018

(86) PCT No.: PCT/JP2018/043838
§ 371 (c)(1),
(2) Date: Mar. 30, 2020

(87) PCT Pub. No.: WO2019/107436
PCT Pub. Date: Jun. 6, 2019

(65) Prior Publication Data
US 2020/0282311 A1    Sep. 10, 2020

(30) Foreign Application Priority Data

Nov. 30, 2017   (JP) .............................. JP2017-230617

(51) Int. Cl.
*A63F 13/20*    (2014.01)
*A63F 13/47*    (2014.01)
(Continued)

(52) U.S. Cl.
CPC ............. *A63F 13/47* (2014.09); *A63F 13/55* (2014.09); *A63F 13/73* (2014.09); *A63F 13/86* (2014.09); *A63F 13/87* (2014.09)

(58) Field of Classification Search
CPC .......... A63F 13/20; A63F 13/30; A63F 13/35; A63F 13/40; A63F 13/45; A63F 13/47;
(Continued)

(56) References Cited

U.S. PATENT DOCUMENTS

| 2014/0004951 A1 | 1/2014 | Kern et al. |
| 2014/0235336 A1 | 8/2014 | Morimoto et al. |

(Continued)

FOREIGN PATENT DOCUMENTS

| CN | 103345794 A | 10/2013 |
| CN | 104168271 A | 11/2014 |

(Continued)

OTHER PUBLICATIONS

"Interaction Between Audience and Game Players During Live Streaming of Games", Sep. 20, 2016, Jack Greenburg, accessed Oct. 23, 2020, pp. 2-7.*

(Continued)

*Primary Examiner* — Omkar A Deodhar
(74) *Attorney, Agent, or Firm* — Dorsey & Whitney LLP

(57) ABSTRACT

An intervention server according to an aspect of the present invention includes a receiver, a filter, and an intervener. The receiver receives pieces of first user input information from a plurality of audience terminals to which a live play video of a game is distributed. The filter filters the pieces of the first user input information. The intervener intervenes in a progress of the game based on the filtered pieces of the first user input information.

12 Claims, 5 Drawing Sheets

(51) Int. Cl.
*A63F 13/55* (2014.01)
*A63F 13/73* (2014.01)
*A63F 13/86* (2014.01)
*A63F 13/87* (2014.01)

(58) Field of Classification Search
CPC .......... A63F 13/50; A63F 13/55; A63F 13/70; A63F 13/86; A63F 13/87; A63F 2300/577; A63F 2300/60; A63F 2300/632
See application file for complete search history.

(56) References Cited

U.S. PATENT DOCUMENTS

| | | | |
|---|---|---|---|
| 2015/0281296 A1 | 10/2015 | Takaichi et al. | |
| 2017/0001111 A1* | 1/2017 | Willette | A63F 13/49 |
| 2017/0001112 A1 | 1/2017 | Gilmore et al. | |
| 2017/0001122 A1 | 1/2017 | Leung et al. | |
| 2017/0003740 A1 | 1/2017 | Verfaillie et al. | |
| 2017/0003784 A1 | 1/2017 | Garg et al. | |
| 2017/0006074 A1 | 1/2017 | Oates, III | |
| 2017/0006322 A1 | 1/2017 | Dury et al. | |
| 2017/0072324 A1 | 3/2017 | Navok et al. | |
| 2018/0095708 A1* | 4/2018 | Black | G06F 3/04845 |

FOREIGN PATENT DOCUMENTS

| | | |
|---|---|---|
| CN | 104756513 A | 7/2015 |
| CN | 105872781 A1 | 8/2016 |
| CN | 105916047 A | 8/2016 |
| CN | 107276984 A | 10/2017 |
| CN | 107426598 A | 12/2017 |
| EP | 2769756 A1 | 8/2014 |
| EP | 2916558 A1 | 9/2015 |
| EP | 3316980 A1 | 5/2018 |
| JP | 2014158620 A | 9/2014 |
| JP | 2015077299 A | 4/2015 |
| JP | 2015230684 A | 12/2015 |
| JP | 2017056195 A | 3/2017 |
| JP | 2018520772 A | 8/2018 |
| KR | 20180022866 A | 3/2018 |
| WO | 2014068806 A1 | 5/2014 |
| WO | 2015056370 A1 | 4/2015 |
| WO | 2015186402 A1 | 12/2015 |
| WO | 2017004433 A1 | 1/2017 |

OTHER PUBLICATIONS

English translation of Decision of Dismissal of Amendment for JP Application No. 2017-230617, dated May 21, 2019.
English translation of Decision of Refusal for JP Application No. 2017-230617, dated Feb. 5, 2019.
English translation of Decision to Grant a Patent for JP Application No. 2017-230617, dated Oct. 8, 2019.
Ishii, "Statistics, Probability and or Business Statistics", Jitsugyo No Nihon-Sha, Ltd., First Edition 1st Printing, Jun. 30, 2017, pp. 86-87.
English translation of International Search Report and Written Opinion for Application No. PCT/JP2018/043838, dated Feb. 12, 2019.
English translation of Notice of Reasons for Refusal for JP Patent Application No. 2017-230617, dated Aug. 28, 2018.
1st Office Action for CN Application No. 201880062992.7, dated Sep. 17, 2020;1st OA and English translation retrieved from Global Dossier of USPTO dated Oct. 20, 2020.
2nd Office Action for CN Application No. 201880062992.7, dated Jan. 29, 2021.

* cited by examiner

INTERVENTION SERVER AND INTERVENTION PROGRAM

RELATED APPLICATIONS

This application is a 371 National Stage application of International Application No. PCT/JP2018/043838, filed Nov. 28, 2018, which claims priority to Japanese Patent Application No. 2017-230617, filed on Nov. 30, 2017. The aforementioned applications are incorporated herein by reference, in its entirety, for any purposes.

TECHNICAL FIELD

The present invention relates to live distribution of game play videos.

BACKGROUND ART

Video games are roughly classified into a stand-alone type and an online type (e.g., a cloud type or a massively multiplayer online (MMO) type). A stand-alone game is implemented by executing a program with a terminal, that is, played by one or a few players at most. On the other hand, an online game is implemented by executing a program with terminals and a game server connected to the terminals. An MMO game is played by hundreds to thousands of players connected to a network at the same time. As basic play of such a game, the players operate the game and enjoy the feedback, for example, changes in the game screens or sound, or vibrations.

In recent years, videos in a genre called live streaming of game playthroughs have emerged in the field of video sharing systems. The live streaming of a game playthrough is a content sharing method that broadcasts live, to a big audience, a game being played by a player (i.e., a distributor) with commentary.

Some video sharing systems allow the audience to post comments on live broadcast videos. The comments posted by an audience member can be viewed not only by the other audience members but also by the distributor. The distributor then plays the game in accordance with the advices or request of the audience. In response, the audience posts further comments. Such systems provide interactive game experiences.

Japanese Unexamined Patent Application No. 2016-189804 discloses obtaining and counting comments input during watching of a game play video, and selecting a presentation method [0011]. According to Japanese Unexamined Patent Application No. 2016-189804, however, the presentation methods with different effects, background materials, and screen decorations are defined, each of which method fails to change the game play itself and merely changes the appearance (see, e.g., paragraph [0085] and FIG. 18).

SUMMARY OF THE INVENTION

Only with a mechanism that allows audience to post comments on a live streaming video and a distributor to view the comments, the audience has a limited influence on the progress of a game. For example, even a large number of comments posted by the audience have no influence on the progress of the game, if the distributor overlooks or ignores the comments. In this manner, in known live streaming of game playthroughs, only the distributor is directly engaged in the progress of the game, and thus the will of the audience has no influence on the progress of the game regardless of the will of the distributor.

On the other hand, assume that live streaming of game playthroughs allows the audience to directly intervene in the progress of the game and there is a large number of, for example, tens of thousands or hundreds of thousands of audience. The reflection of the will of all the audience on the progress of the game control causes a large amount of access to the server and thus a high load on the server. If there is a difference in the will of the audience to be reflected, for example, if there are a group wishing to move a character to the right and the other group to the left, it is impossible to reflect the will of the both groups at the same time.

It is an object of the present invention to allow audience to intervene in the progress of a game, while reducing an increase in the processing load on a server.

An intervention server according to an aspect of the present invention includes a receiver, a filter, and an intervener. The receiver receives pieces of first user input information from a plurality of audience terminals to which a live play video of a game is distributed. The filter filters the pieces of the first user input information. The intervener intervenes in a progress of the game based on the filtered pieces of the first user input information.

The present invention allows audience to intervene in the progress of a game, while reducing an increase in the processing load on a server.

DESCRIPTION OF EMBODIMENT

Figure 1:
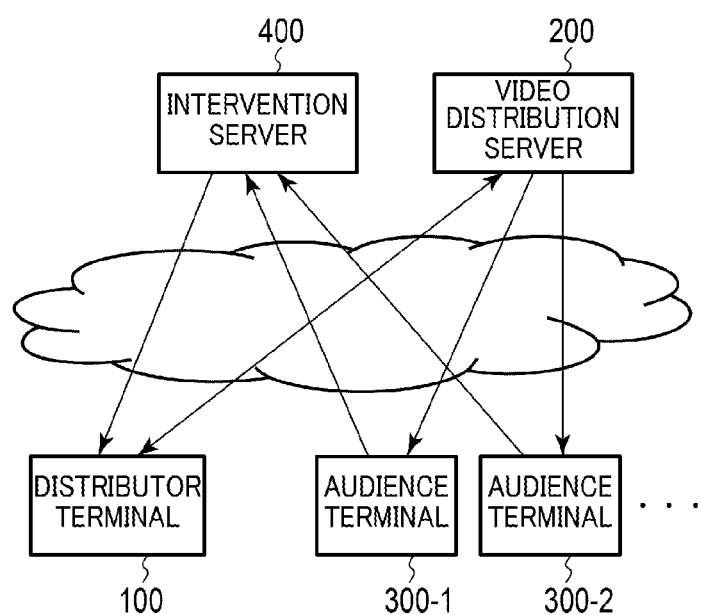
FIG. 1 is a block diagram showing an example live video distribution system including an intervention server according to an embodiment.

Now, an embodiment will be described with reference to the drawings. The same or similar reference characters are hereinafter used to represent the same or similar elements to those already described, and the detailed explanation thereof will be basically omitted. For example, if there are the same or similar elements, a common reference character may be used to explain the elements without distinction, or suffix numbers may be used in addition to the common reference character to explain the elements with distinction.

Embodiment

An intervention server according to an embodiment may be incorporated in a live video distribution system illustrated in FIG. 1. This live distribution system includes: a distributor terminal 100; a video distribution server 200; audience terminals 300-1, 300-2, . . . ; and an intervention server 400.

In the example of FIG. 1, the video distribution server 200 distributes live stand-alone game play videos executed by the distributor terminal 100 to the distributor terminal 100 and the audience terminals 300. The intervention server 400 intervenes in the progress of games executed by the distributor terminal 100 based on user input information from the audience terminals 300.

The video distribution server 200 is connected to the distributor terminal 100 and the audience terminals 300 via a network and allows data transmission. Similarly, the intervention server 400 is connected to the distributor terminal 100 and the audience terminals 300 via the network. The intervention server 400 receives the user input information from at least the audience terminals 300 and transmits, to the distributor terminal 100, control data for the intervention in the progress of games.

The numbers of terminals or devices shown in FIG. 1 are illustrative only. For example, the number of the audience terminals 300 changes from moment to moment and thus may be zero, hundreds, or thousands. In addition, a web server or a comment distribution server (not shown in FIG. 1) may be further placed, or such a function may be integrated into the video distribution server 200.

The distributor terminal 100 may be, for example, an electronic device such as a computer capable of executing stand-alone game programs. Examples of the electronic device include a television receiver (including an internet television), a personal computer (PC), a mobile terminal (e.g., a tablet, a smartphone, a laptop, a feature phone, a portable game player, a digital music player, and an electronic book reader), a virtual reality (VR) terminal, and an augmented-reality (AR) terminal. The distributor terminal 100 is not limited thereto. The distributor terminal 100 adds, for example, the narration of the distributor to a game play video, encodes video data, and sequentially transmits the encoded video data to the video distribution server 200.

The distributor terminal 100 may be physically divided into a device that executes game programs and a device that encodes play videos and transmits the encoded video data. In this case, the play video may or may not be directly output by the device that executes the game programs. In the latter case, for example, the screen of a display device connected to the device that executes the game programs is captured to generate the play videos.

The video distribution server 200 receives the encoded video data sequentially transmitted from the distributor terminal 100. The video distribution server 200 then distributes this video data to the distributor terminal 100 and the audience terminals 300. The audience terminals 300 may be electronic devices similar to the distributor terminal 100. However, the audience terminals 300 may not necessarily be capable of executing game programs.

The intervention server 400 receives the user input information from the audience terminals 300, filters the information to reduce the load, and intervenes in the progress of games executed by the distributor terminal 100 based on the filtered user input information. For example, the intervention server 400 may generate the control data for controlling the progress of games and transmit the control data to the distributor terminal 100.

Such control data may be, for example, the same as, or similar to, operation data based on the user input at the distributor terminal 100 or may be special codes different from normal operation data, such as codes for operating parameters in games or codes for operating event flags. In any case, the programs executed by the distributor terminal 100 operate based on this control data.

This operation of the intervention server 400 allows, for example, at least part of the will of the audience viewing a live play video of a stand-alone game affects the progress of the game and eventually the play video watched by the audience itself, which provides an interactive, highly cohesive game experience. In addition, the intervention server 400 samples the will of the audience by filtering, thereby allowing intervention that roughly reflects the will of the audience, while reducing an increase in the processing load.

The videos distributed live by the video distribution server 200 may be related not only to stand-alone games but also to online games or to games of the both types. For example, the videos may be related to a game in which a player (e.g., a distributor) operates an artificial life form developed by the player in a virtual world where artificial life forms developed by other players coexist. In this exemplary game, the artificial life forms may be developed using machine learning. The machine learning for developing the artificial life forms may be performed by the game server or by the distributor terminal 100 as a stand-alone game because simultaneous execution of the machine learning for a large number of artificial life forms requires a high calculation load.

Alternatively, the videos distributed live by the video distribution server 200 may be related to games other than video games, for example, electronically controllable arcade games, roulette games, or board games.

Figure 2:
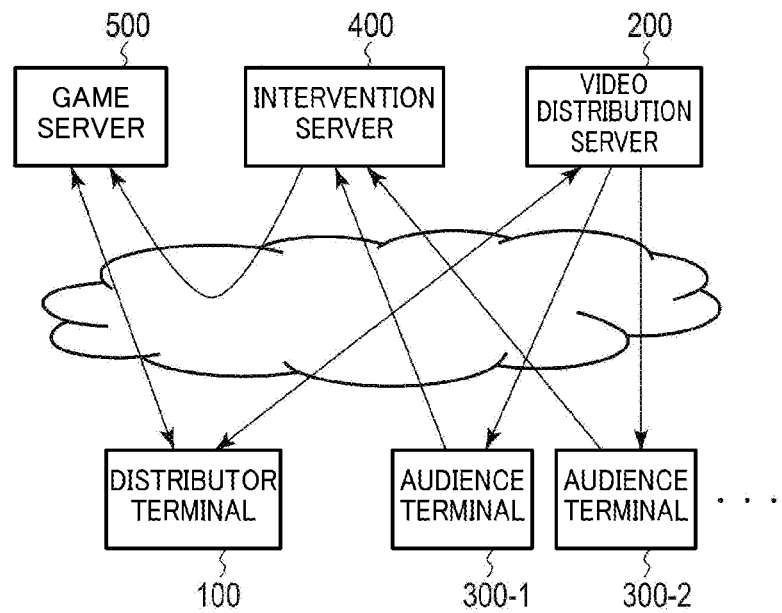
FIG. 2 is a block diagram showing another example live video distribution system including the intervention server according to the embodiment.

FIG. 2 illustrates another example live video distribution system. In the example of FIG. 2, the video distribution server 200 distributes live, to the distributor terminal 100 and the audience terminals 300, online game play videos executed by the distributor terminal 100 and a game server 500. In this example, the intervention server 400 intervenes in the progress of games executed by the game server 500, not by the distributor terminal 100, based on the user input information from the audience terminals 300.

The video distribution server 200 is connected to the distributor terminal 100 and the audience terminals 300 via a network and allows data transmission. Similarly, the intervention server 400 is connected to the audience terminals 300 and the game server 500 via the network. The intervention server 400 may receive the user input information from at least the audience terminals 300 and transmit, to the game server 500, the control data for the intervention in the progress of games. The game server 500 is connected to the distributor terminal 100 via the network and allows data transmission.

The numbers of terminals or devices shown in FIG. 2 are illustrative only. For example, the number of the audience terminals 300 changes from moment to moment and thus may be zero, hundreds, or thousands. In addition, a web server or a comment distribution server (not shown in FIG. 2) may be placed, or such a function may be integrated into the video distribution server 200.

The distributor terminal 100 shown in FIG. 2 is basically the same as, or similar to, the distributor terminal 100 shown in FIG. 1. However, the distributor terminal 100 in FIG. 2 may execute at least online game programs (client programs). During the execution of the game program, the distributor terminal 100 transmits, to the game server 500, operation data based on the user input, receives and displays the feedback, such as a game play video, from the game server 500. The distributor terminal 100 adds, for example, the narration of the distributor to the game play video received from the game server 500, encodes video data, and sequentially transmits the encoded video data to the video distribution server 200.

The video distribution server 200 and the audience terminals 300 shown in FIG. 2 are basically the same as, or similar to, the video distribution server 200 and the audience terminals 300 shown in FIG. 1.

The intervention server 400 receives the user input information from the audience terminals 300, filters the information to reduce the load, and intervenes in the progress of games executed by the game server 500 based on the filtered user input information. For example, the intervention server 400 may generate the control data for controlling the progress of games and transmit the control data to the game server 500.

Such control data may be, for example, the same as, or similar to, the operation data based on the user input at the distributor terminal 100 or may be special codes different from normal operation data, such as codes for operating parameters in games or codes for operating event flags. In any case, the programs executed by the game server 500 operate based on this control data.

The game server 500 is a computer capable of executing online game programs (server programs). During the execution of a game program, the game server 500 receives, from the distributor terminal 100, the operation data based on the user input, generates the feedback such as a game play video, and transmits the feedback to the distributor terminal 100.

This operation of the intervention server 400 allows, for example, at least part of the will of the audience viewing a live play video of an online game affects the progress of the game and eventually the play video itself viewed by the audience, which provides an interactive, highly cohesive game experience. In addition, the intervention server 400 samples the will of the audience by filtering, thereby allowing intervention that roughly reflects the will of the audience, while reducing an increase in the processing load.

Even in a game other than video games, the intervention server 400 transmits the control data to the distributor terminal 100, the game server 500, or any other device controlling the progress of the game to achieve the intervention based on the will of the audience.

Now, the intervention server 400 will be described in detail with reference to FIGS. 3 to 7. For simplicity, it is assumed that the intervention server 400 is applied to the live distribution system shown in FIG. 1. The following description may be read as appropriate so that the intervention server 400 is applicable to the live distribution system shown in FIG. 2 or any other live distribution systems.

The intervention server 400 is a computer including a processor and a memory. The processor performs filtering of the user input information received from the audience terminals 300, intervention processing in the progress of games, user authentication processing, and control of the notification to the audience terminals 300. The memory temporarily stores programs executed by the processor to implement such processing and the data to be used by the processor. The intervention server 400 may be a combination of a plurality of computers. For example, a plurality of functional units of the intervention server 400, for example, a receiver 401, a filter 402, and an intervener 403, which will be described later, may be distributed into and mounted on different computers.

The intervention server 400 may use a communication device to be connected to the network. The communication device may be built in the intervention server 400 or externally attached to the intervention server 400.

The communication device communicates with the distributor terminal 100 and the audience terminals 300 via the network. For example, the communication device receives the user input information from the audience terminals 300 and transmits, to the distributor terminal 100, the control data for intervention in the progress of games.

Figure 3:
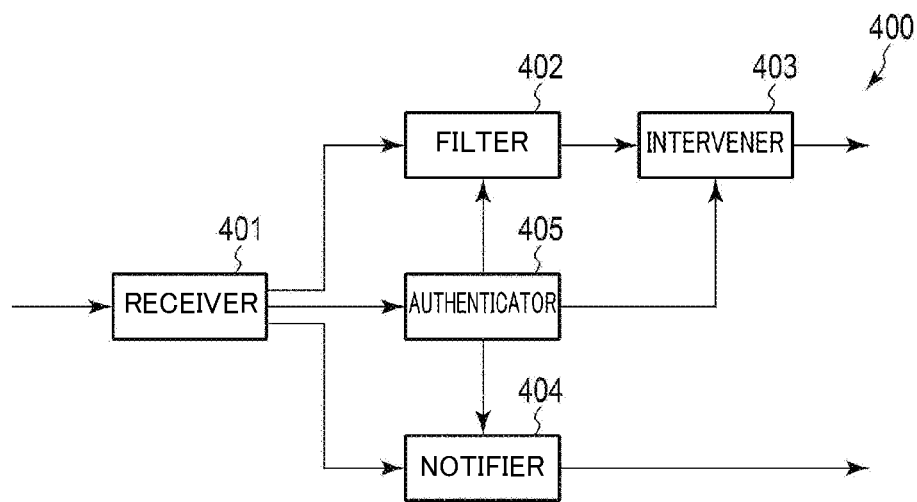
FIG. 3 is a block diagram illustrating the intervention server according to the embodiment.

Now, the description of the example configuration of the intervention server 400 will be continued with reference to FIG. 3. The intervention server 400 shown in FIG. 3 includes the receiver 401, the filter 402, the intervener 403, a notifier 404, and an authenticator 405.

The receiver 401 receives, via the network, the user input information from the audience terminals 300 to which a live play video of a game is distributed by the video distribution server 200, and transmits the user input information to the filter 402. The user input information may be, for example, information such as answer data to questionnaires notified to the audience terminals 300 by the notifier 404, which will be described later, or comments posted by the audience terminals 300. The comments may be received via a comment distribution server (not shown). The information is however not limited thereto. The receiver 401 may receive the user input information only during an acceptable intervention period, which will be described later. Such limitation on the period for receiving the user input information reduces the processing load on the intervention server 400. The receiver 401 may be the communication device described above or an interface with the communication device.

The receiver 401 may receive, for example, information on a start trigger of the acceptable intervention period, which will be described later, from the distributor terminal 100 via the network and transmit the information to the notifier 404. In addition, the receiver 401 may receive data on the user authentication, such as input passwords or biological information, from the audience terminals 300 via the network and transmit the data to the authenticator 405.

The filter 402 receives, from the receiver 401, the user input information to the audience terminals 300 and filters the information. The filter 402 may be the processor and the memory described above.

Specifically, the filter 402 may perform filtering to thin the received user input information. The filter 402 may thin the user input information based on various types of algorithms.

For example, the filter 402 may automatically discard or not receive a predetermined percentage of the received user input information to reduce the amount of user input information to be taken into consideration by the intervener 403. The predetermined percentage may be fixed or variable. For example, the predetermined percentage may increase with an increase in the number of audience. With an increase in the number of audience, the amount of user input information expected to be received increases. The statistical properties of the population are thus not greatly impaired even if most of the user input information is removed at random.

For example, once the total amount of the received user input information reaches a predetermined upper limit, the filter 402 may automatically discard the user input information received afterward or may not receive further user input information afterward. In this example, if for example the notifier 404 notifies the audience terminals 300 that intervention is possible, the notifier 404 may immediately stop the notification after the total amount of the received user input information reaches the predetermined upper limit, so that the intervener 403 may intervene and allow a game to proceed smoothly. Alternatively, the notifier 404 may intentionally continue the notification to allow the audience members who have responded late to feel that they have also intervened in the progress of the game.

Such filtering by the filter 402 reduces the load of the integration processing of the user input information on the intervention server 400, while maintaining the basic framework that a result of integration of the will of the audience is reflected in the progress of a game.

Alternatively, the filter 402 may perform filtering based on a result of the user authentication notified by the authenticator 405. For example, the filter 402 may vary the probability that the user input information from each audience terminal 300 used by the audience member is thinned, in accordance with the attribute of the audience member. The attributes of the audience members may include the browsing histories, the number of comments posted, the member categories (e.g., the free or paid members of the viewing service of live streaming of game playthroughs), the presence or absence of charges, the amount of charges, etc., of the audience members. For example, the filter 402 may thin the user input information by the authenticated audience members (i.e., the user input information from the audience terminals 300 which have passed the user authentication) at a lower percentage than the user input information by the unauthenticated audience members (i.e., the user input information from the audience terminals 300 that have not passed the user authentication). Such filtering gives, to the audience, an incentive to proactive authentication. In addition, the will of the authenticated audience members is more likely to influence the progress of a game, which is expected to increase the satisfaction of the audience.

Instead of or in addition to filtering performed by filter 402, de facto filtering may be performed prior to the receipt of the user input information. Specifically, before the notifier 404 notifies that intervention is possible, a drawer (not shown) may draw ones of the audience terminals 300. Based on the result of the drawing, whether the will of the audience is taken into consideration or not is determined. For example, the notifier 404 may notify the winning audience terminals 300 that intervention is possible and may not notify the losing audience terminals 300 that intervention is possible. Alternatively, the notifier 404 may transmit, to each winning audience terminal 300, for example, control data for displaying a graphical user interface (GUI) component that allows answering a questionnaire (i.e., information indicating that the GUI is selected is transmitted to the intervention server 400) together with the notification that intervention is possible. To each losing audience terminal 300, the notifier 404 may transmit control data for displaying a dummy GUI component, appearance of which is similar to the GUI component but which does not allow answering any questionnaire (i.e., information indicating that the GUI is selected is not transmitted to the intervention server 400) together with the notification. Such display of the dummy GUI components to the losing audience terminals 300 allows the audience to feel that they have frequent opportunities to intervene in the progress of a game.

The intervener 403 receives the filtered user input information from the filter 402 and intervenes in the progress of a game based on the user input information. Specifically, the intervener 403 integrates the filtered user input information, generates control data for intervention in the progress of the game based on the integrated user input information, and transmits the control data to the distributor terminal 100 via the network. The intervener 403 may be a combination of the processor and memory, described above, and the communication device or an interface with the communication device.

Specifically, the intervener 403 may perform intervention of (1) controlling the conversations or actions of a player character or other characters in a game, (2) causing additional objects, such as items, traps, or gimmicks, or additional effects, such as buffs or nerfs of the player character or other characters, to occur in the game, or (3) causing the existing objects or effects in the game to change or disappear.

Figure 4:
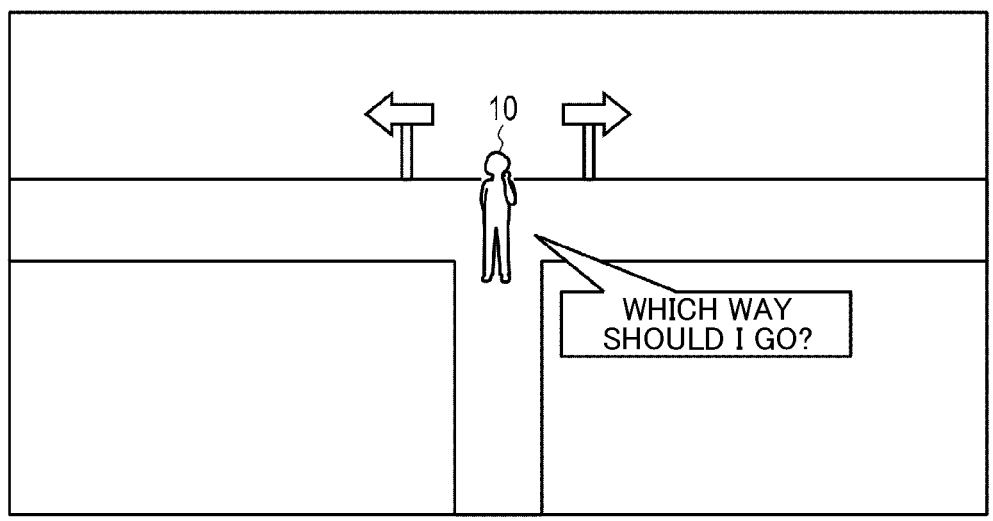
FIG. 4 shows an example video distributed live in the system shown in FIG. 1 or 2.
Figure 5:
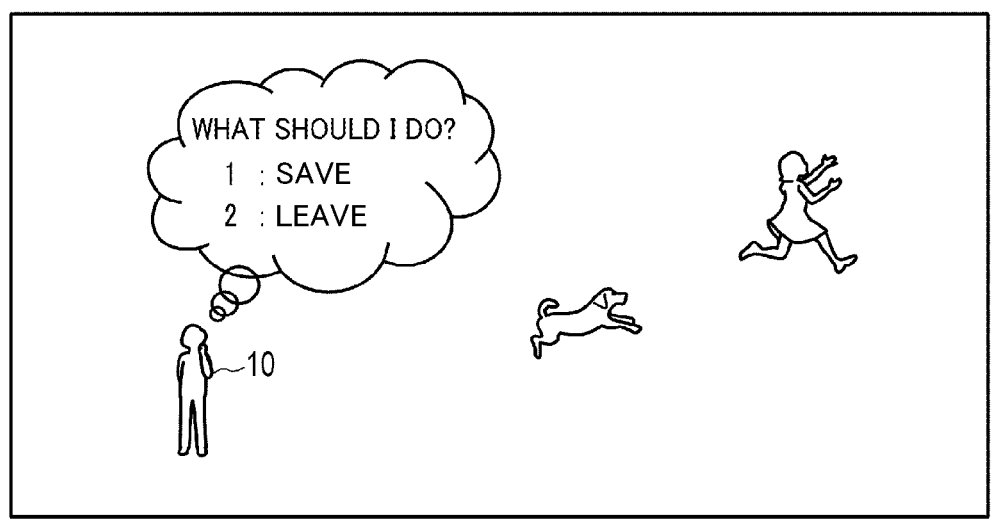
FIG. 5 shows another example video distributed live in the system shown in FIG. 1 or 2.
Figure 6:
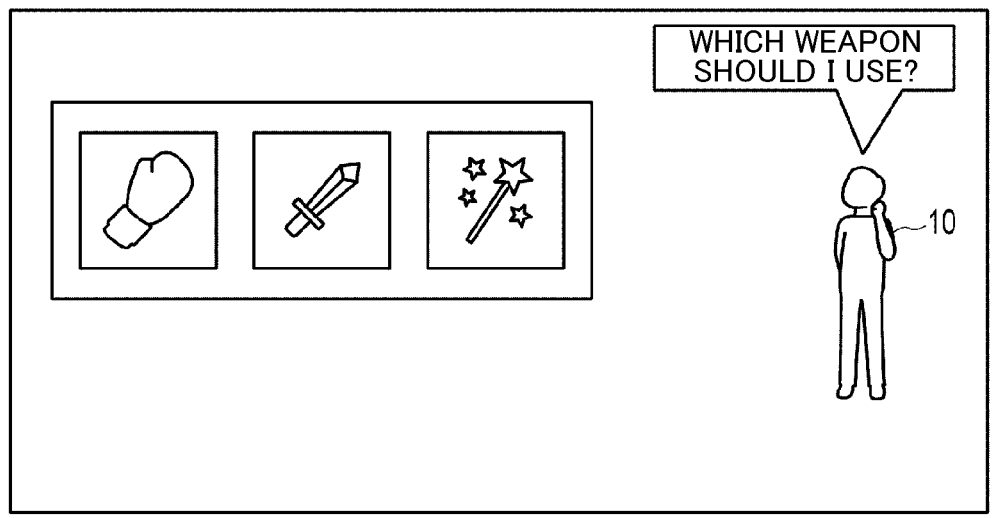
FIG. 6 shows yet another example video distributed live in the system shown in FIG. 1 or 2.
Figure 7:
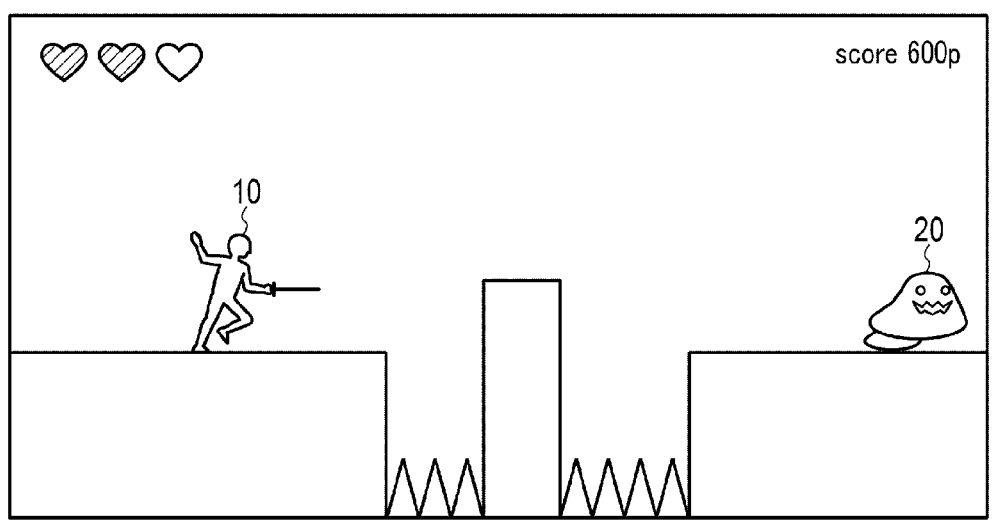
FIG. 7 shows still another example video distributed live in the system shown in FIG. 1 or 2.

For example, when a player character 10 is at a crossroads as illustrated in FIG. 4, the intervener 403 allows the player character 10 to go to the right or left road based on the will of the audience. In the scene of choosing the course of action of the player character 10 as illustrated in FIG. 5, the intervener 403 may determine the course of action of the player character 10 based on the will of the audience. In the scene where the player character 10 is asked which weapon to choose, as illustrated in FIG. 6, the intervener 403 may determine the answer of the player character based on the will of the audience. In the scene where the player character 10 moves forward as illustrated in FIG. 7 while defeating an enemy character 20, the intervener 403 may cause items or effects for recovery of the vitality of the player character 10 to appear, provide a bridge so that the player character 10 will not fall down, cause effects such as buffs or nerfs of the enemy character 20 to appear, or cause an additional enemy character to appear, based on the will of the audience.

The intervener 403 may integrate the user input information by a majority vote, for example. That is, the intervener 403 may count the filtered user input information on a type-by-type basis and generate control data based on the majority user input information. For example, as shown in FIG. 4, when the player character 10 is at the crossroads, the intervener 403 counts the amount of the user input information choosing the left road and the amount of the user input information choosing the right road. As a result of the counting, if the former gains 1,000 votes and the latter gains 500 votes, the intervener 403 may generate control data that allows the player character 10 to choose the left road and transmit the control data to the distributor terminal 100. In the case in which the user input information is the information on the comments posted by the audience, the intervener 403 may perform natural language processing, such as keyword extraction or intention understanding, and count the keywords included in the comments or the intentions of the comments.

The intervener 403 may not simply take a majority vote but may assign weights on the user input information based on the result of user authentication notified by the authenticator 405. For example, the intervener 403 may apply, in accordance with the attributes of audience, different weights (different right to speak) on the votes of the user input information from the audience terminals 300 used by the audience. For example, the intervener 403 may count the user input information by an authenticated audience member having a certain attribute as three votes, the user input information by an authenticated audience member having another attribute as two votes, and the user input information by an unauthenticated audience member as one vote.

Alternatively, the intervener 403 may integrate the user input information using an algorithm other than a majority vote. For example, the intervener 403 may treat, as a result of integration of the user input information, the user input information received earliest, the user input information received latest, the user input information received at a time closest to a predetermined time (e.g., after a predetermined time from the start of the acceptable intervention period), the user input information received at a predetermined ordinal number, or the user input information gaining a predetermined number of votes earliest. Alternatively, the intervener 403 may treat, as a result of integration of the user input information, the one selected in the vote from the received user input information. In these cases as well, the intervener 403 may take the attributes of the audience members into consideration. For example, the intervener 403 may advance or delay the receipt times of the user input information in accordance with the attributes of the audience members who gave the information, or may increase or decrease the winning probability in the drawing in accordance with the attributes of the audience members.

The intervener 403 may further take the user input information from the distributor terminal 100 into consideration. For example, the intervener 403 may notify the distributor terminal 100 of the result of integration of the user input information from the audience terminals 300 and may transmit control data based on the result of integration to the distributor terminal 100 if there is user input information indicating acceptance of the result of integration. For example, the intervener 403 may request acceptance of the distributor if the percentage or number of votes of certain user input information is low or small as a result of integration. Alternatively, the intervener 403 may integrate the user input information from the distributor terminal 100 as well, similarly to the user input information from the audience terminals 300. For example, the intervener 403 may count the user input information from the distributor terminal 100 as 100 votes or any other number of votes and may integrate the user input information based on a majority vote.

An example has been described above in which the intervener 403 integrates the user input information. Instead, an integrator (not shown) independent of the intervener 403 may perform the integration.

The notifier 404 receives, from the receiver 401, information on the start trigger of the acceptable intervention period in which the intervention of the audience in the progress of a game is acceptable, and detects the start of the acceptable intervention period based on this information. Before the end of the acceptable intervention period, the notifier 404 notifies the audience terminals 300 that intervention in the progress of the game is possible. The notifier 404 may be a combination of the processor and memory, described above, and the communication device or an interface with the communication device.

The acceptable intervention period may be designed to start, for example, based on the will of the distributor or the audience, depending on the progress of the game, or regardless of these factors.

For example, the notifier 404 may detect the start of the acceptable intervention period when predetermined user input information given to the distributor terminal 100 (or the audience terminals 300) is received. Such user input information is defined as the start trigger of the acceptable intervention period, and may be, for example, pressing a predetermined GUI button displayed on the screen of the distributor terminal 100 (or each audience terminal 300).

For example, each game program may be designed so that the distributor terminal 100 sequentially reports the information on the progress of the game, such as event flags or parameters in the game, to the intervention server 400. When the progress reaches the state defined as the start trigger of the acceptable intervention period (e.g., at an occurrence of a predetermined event, at a reach of a predetermined point, or at a break in the operation by the distributor for a predetermined time period), the notifier 404 may detect the start of the acceptable intervention period. Alternatively, the progress of the game may be estimated from the video or audio feature of the play video without direct monitoring of the information on the progress of the game. The state of the game may be estimated using a trained model created by machine learning, for example. For example, the notifier 404 may detect the start trigger of the acceptable intervention period from the fact, for example, that the vitality of the player character suddenly decreases in view of a change in the health bar in a play video, and the fact that a certain event such as a boss fight has started in view of a change in the background music (BGM).

For example, the acceptable intervention period may be repeated in a regular or irregular cycle or may start at random timing regardless of the will of the distributor, the will of the audience, or the progress of the game.

The acceptable intervention period may continue for a predetermined time period from the start trigger, for example. Alternatively, the acceptable intervention period may continue from the start trigger until a predetermined number of comments are posted, until there is a user input by the distributor to abort the acceptable intervention period, or until there are a predetermined number of user inputs relating to the intervention by the audience.

An example has been described above in which the notifier 404 determines whether it is the acceptable intervention period or not. Instead, a determiner (not shown) independent of the notifier 404 may perform the determination.

The notifier 404 may transmit, to each audience terminal 300, a questionnaire including a plurality of options for choosing desired intervention in the progress of a game, for example. The questionnaire is displayed, for example, on each audience terminal 300 with the answer buttons associated with the options arranged, and the audience presses, as the user input, the answer buttons associated with the desired options using the input devices at the audience terminals 300 to transmit such user input information to the intervention server 400.

Alternatively, the notifier 404 may transmit, to each audience terminal 300, a notification to request the audience to post comments indicating desired intervention in the progress of a game, for example. Such notification may be displayed as a text such as "[Now accepting comments] Which way to go?" on each audience terminal 300. The audience posts, as the user inputs, comments indicating desired intervention using the input devices at the audience terminals 300 to transmit such user input information to the intervention server 400 (via a comment distribution server).

Before the end of the acceptable intervention period, the notifier 404 may transmit, to the audience terminals 300, a notification (e.g., a push notification) that prompts the audience to do user authentication, such as a notification indicating that user authentication is required to intervene in the progress of a game, prior to the notification described above. This motivates the audience members who have not registered as users into user registration and thus increases the number of additional users. The unauthenticated users are motivated into login and thus facilitates grasp of the viewing behaviors of the users. The notifier 404 may transmit the notification described above (i.e., notify that intervention in the progress of a game is possible) only to the audience terminals 300 that have passed the user authentication. This reduces the various processing loads with respect to the notification to unauthenticated audience members or the user input information from the unauthenticated audience members.

If a means other than a notification by the notifier 404 allows the audience to know the start of the acceptable intervention period, the notifier 404 may be omitted. For example, the distributor may start the acceptable intervention period using the own user input as a trigger and, before or after the start, add narration such as "Which way should I go?", "What should I do?", "Which should I choose?" or "Help!" to a play video to request the audience to intervene in the progress of a game. By hearing or seeing this, the audience implicitly knows the start of the acceptable intervention period. During the acceptable intervention period, a simple change in the play video, such as a darker play video than usual, stop of the time, and change in the BGM, may allow the audience to know the start of the acceptable intervention period.

The authenticator 405 receives data on the user authentication from the receiver 401 and performs user authentication for the audience terminals 300 based on the received data. The authenticator 405 may achieve the user authentication utilizing, for example, a known authentication technique such as password authentication or biometric authentication. The authenticator 405 transmits the result of user authentication to the filter 402, the intervener 403, and the notifier 404.

Figure 8:
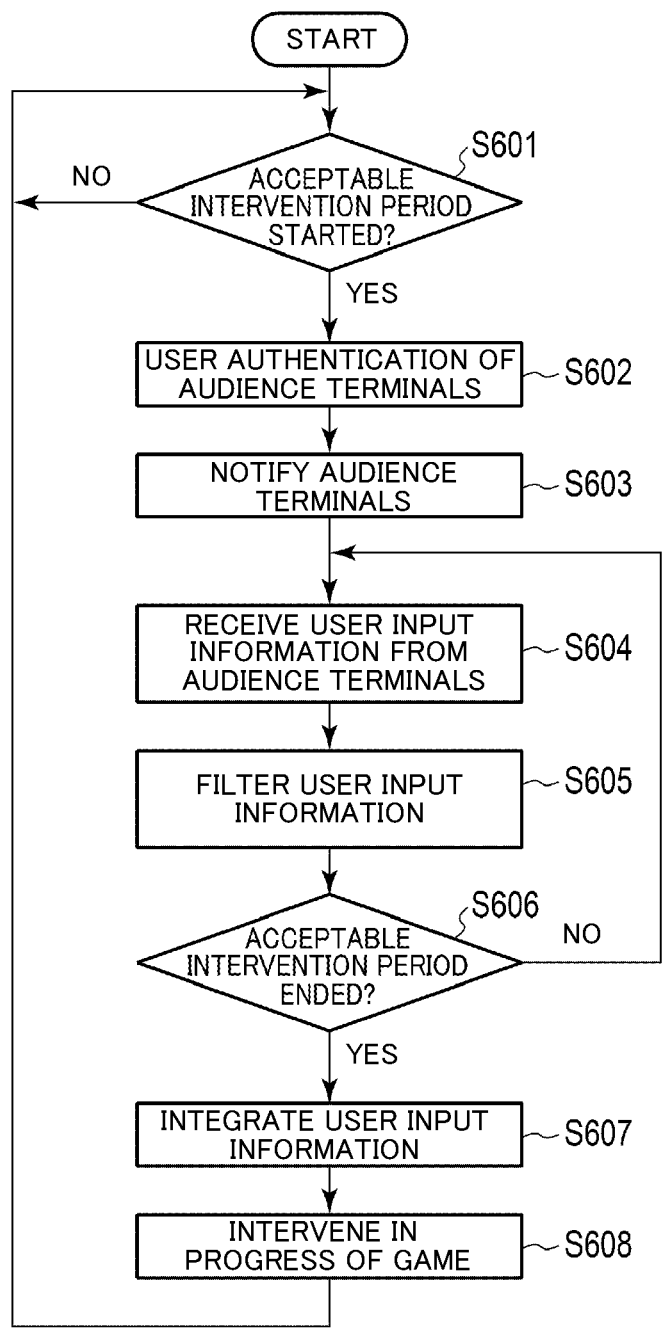
FIG. 8 is a flowchart illustrating an operation of the intervention server shown in FIG. 3.

Next, an example operation of the intervention server 400 will be described with reference to FIG. 8. After live distribution of a play video, the intervention server 400 does not basically operate until the start of the acceptable intervention period (step S601). After the start of the acceptable intervention period, that is, detection of the start trigger of the acceptable intervention period, the process proceeds to step S602.

In step S602, the authenticator 405 performs user authentication for the audience terminals 300. The user authentication may be performed not only after the start of the acceptable intervention period but also at any time before the start of the acceptable intervention period. Then, the notifier 404 notifies, for example, the audience terminals 300 that have passed the user authentication in step S602 that intervention in the progress of the game is possible (step S603). After step S603, the process proceeds to step S604.

In step S604, the receiver 401 receives the user input information from (some) audience terminals 300 that have received the notification in step S603. The filter 402 then filters the user input information received in step S604 (step S605). The processing in steps S604 and S605 is repeated until the end of the acceptable intervention period (step S606). The processing in step S605 may be performed all at once after the end of the acceptable intervention period, for example, before the step S606 which will be described later. After the end of the acceptable intervention period, the process proceeds to step S607.

In step S607, the intervener 403 integrates the user input information received in step S604 and filtered in step S605. The user input information may be integrated using various types of algorithms such as the majority vote described above.

The intervener 403 then generates control data for intervention in the progress of the game based on the user input information integrated in step S607 and transmits the control data to the distributor terminal 100 (step S608). After the end of step S608, the intervention server 400 waits for the start of the next acceptable intervention period (step S601).

As described above, the intervention server according to the embodiment receives the user input information from the audience terminals to which a live play video of a game is distributed, filters (thins) the information, and intervenes in the progress of the game based on the filtered user input information. This intervention server therefore allows the audience to intervene in the progress of the game, while reducing an increase in the processing load on the intervention server. That is, for example, at least part of the will of the audience affects the progress of the game and eventually the play video itself viewed by the audience, which provides an interactive, highly cohesive game experience.

(Variation)

In the embodiment described above, the intervention server intervenes in the progress of a game in distribution of a live play video of the game. However, the intervention server may intervene not only in the progress but also in the control of the mode of live distribution. For example, the intervention server may receive user input information from the audience terminals, filter the user input information, and increase or decrease the volume of the voice of the distributor or the area of a picture-in-picture (PinP) based on the filtered user input information.

The embodiment described above is a mere specific example for easier understanding of the concept of the present invention and is not intended to limit the scope of the invention. In the embodiment, various elements may be added, omitted, or replaced without departing from the spirit and scope of the invention.

The various functional units described in the above embodiment may be implemented by using a circuit. Each circuit may be a dedicated circuit for implementing a specific function or may be a general-purpose circuit such as a processor.

At least part of the processing in the above-described embodiment may also be implemented using a general-purpose computer as a basic hardware. Programs for implementing the above processing may be stored in a computer-readable recording medium and provided. The programs are stored in a recording medium as files in installable formats or files in executable formats. Examples of the recording medium include a magnetic disk, an optical disk (e.g., a CD-ROM, a CD-R, a DVD, etc.), a magneto-optical disk (e.g., an MO) and a semiconductor memory. The recording medium may be of any type as long as it is capable of storing programs and readable by a computer. Alternatively, programs implementing the processing described above may be stored in a computer (or a server) connected to a network such as the Internet, and downloaded to computers (i.e., clients) via the network.

The invention claimed is:

1. An intervention server, comprising:
   a receiver configured to receive pieces of first user input information from a plurality of audience terminals to which a live play video of a game is distributed from a distributor terminal via a video distribution server, the game being executed by the distributor terminal;
   a filter configured to filter the pieces of the first user input information; and
   an intervener configured to generate control data for controlling a progress of the game based on the filtered pieces of the first user input information and transmit the control data to the distributor terminal,
   wherein
   the intervener generates the control data by taking a majority vote while applying different weights on votes of the pieces of the first user input information in accordance with attributes of audience members using the audience terminals from which the filtered pieces of the first user input information are transmitted, and the filter varies a probability that each of the pieces of the first user input information is thinned, in accordance with attributes of audience members using the audience terminals from which the pieces of the first user input information are transmitted.

2. The intervention server of claim 1, further comprising:
a notifier configured to notify the plurality of audience terminals that intervention in the progress of the game is possible, before end of an acceptable intervention period in which the intervention in the progress of the game is acceptable, wherein
the receiver receives the pieces of the first user input information throughout the acceptable intervention period.

3. The intervention server of claim 2, wherein
the receiver receives, from the distributor terminal, second user input information defined as a start trigger of the acceptable intervention period, and
the notifier notifies the plurality of audience terminals that the intervention in the progress of the game is possible, when the second user input information is received.

4. The intervention server of claim 3, wherein
the notifier monitors information indicating a state of the progress of the game and notifies the plurality of audience terminals that the intervention in the progress of the game is possible, when the progress reaches a state defined as the start trigger of the acceptable intervention period.

5. The intervention server of claim 2, further comprising:
an authenticator configured to perform user authentication for the plurality of audience terminals, wherein
the notifier notifies ones of the plurality of audience terminals which have passed the user authentication that the intervention in the progress of the game is possible, before the end of the acceptable intervention period.

6. The intervention server of claim 2, further comprising:
an authenticator configured to perform user authentication for the plurality of audience terminals, wherein
the notifier notifies ones of the plurality of audience terminals which have not passed the user authentication, of a need to pass the user authentication to intervene in the progress of the game, before the end of the acceptable intervention period.

7. The intervention server of claim 2 wherein
the notifier notifies each of the plurality of audience terminals of a questionnaire for selecting desired intervention in the progress of the game, before the end of the acceptable intervention period.

8. The intervention server of claim 5, wherein
the filter performs filtering to thin the pieces of the first user input information based on a result of the user authentication.

9. The intervention server of claim 1, wherein
the intervener intervenes in the progress of the game to: (1) control a conversation or an action of a player character or any other character; (2) cause an additional object or an additional effect to appear in the game; or (3) cause an object or an effect in the game to change or disappear, based on the filtered pieces of the first user input information.

10. An intervention program for allowing a computer to function as:
a means for receiving pieces of first user input information from a plurality of audience terminals to which a live play video of a game is distributed from a distributor terminal via a video distribution server, the game being executed by the distributor terminal;
a means for filtering the pieces of the first user input information; and
a means for generating control data for controlling a progress of the game based on the filtered pieces of the first user input information and transmitting the control data to the distributor terminal,
wherein
the means for generating the control data and transmitting the control data to the distributor terminal generates the control data by taking a majority vote while applying different weights on votes of the pieces of the first user input information in accordance with attributes of audience members using the audience terminals from which the filtered pieces of the first user input information are transmitted, and
the means for filtering the pieces of the first user input information varies a probability that each of the pieces of the first user input information is thinned, in accordance with attributes of audience members using the audience terminals from which the pieces of the first user input information are transmitted.

11. A non-transitory computer readable medium storing the intervention program of claim 10.

12. The intervention server of claim 1,
wherein
the filter performs filtering for thinning the pieces of the first user input information.

* * * * *